Nov. 15, 1955     C. B. STAPLETON     2,723,459
INDICATOR TYPE TOOTH THICKNESS SNAP GAGE
Filed June 26, 1952     2 Sheets-Sheet 1
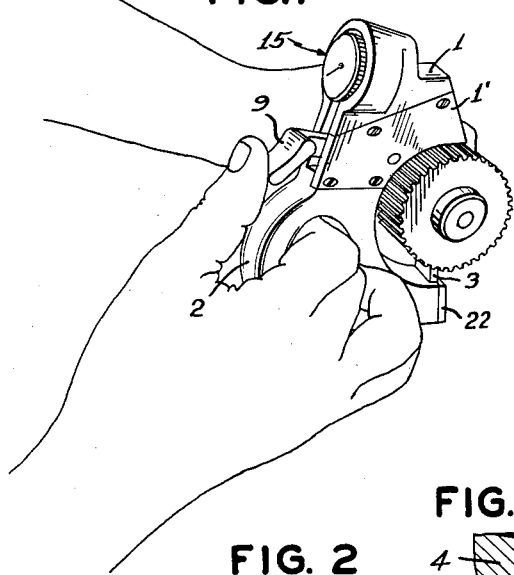
FIG. 1
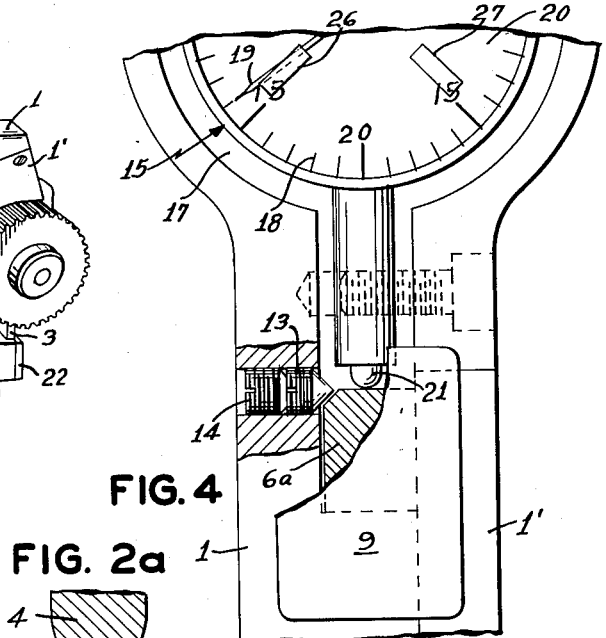
FIG. 4
FIG. 2a
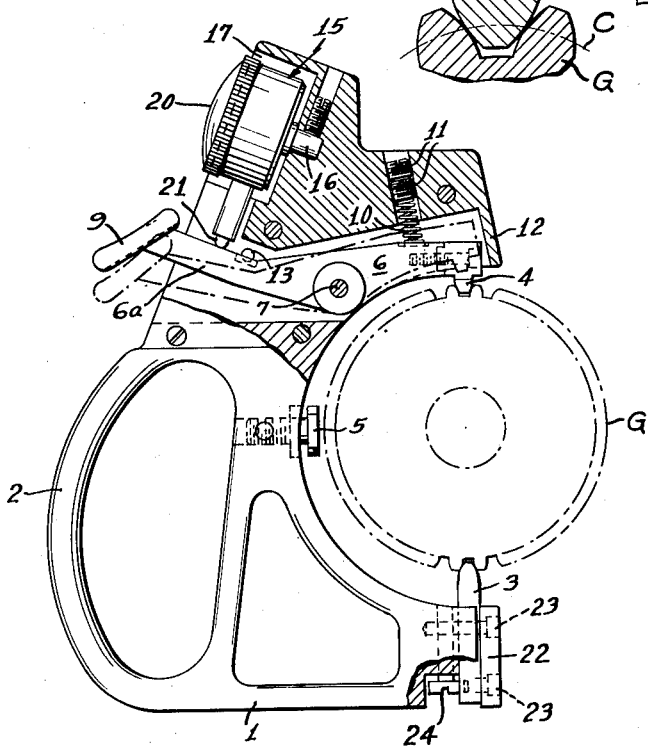
FIG. 2
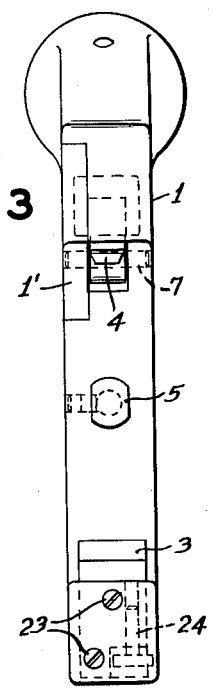
FIG. 3
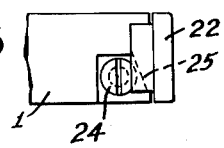
FIG. 5
INVENTOR
Clarence B. Stapleton
BY
ATTORNEYS

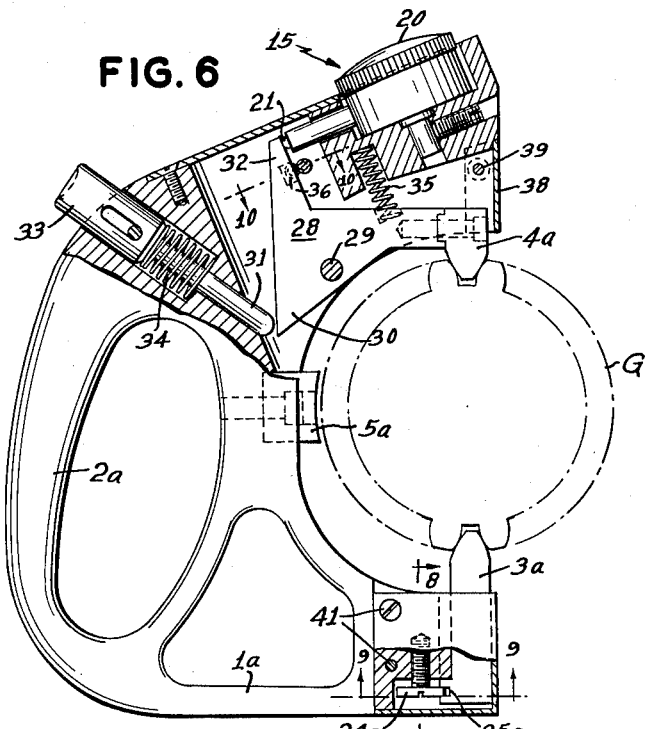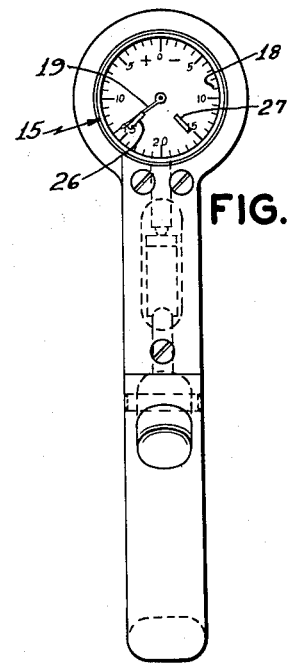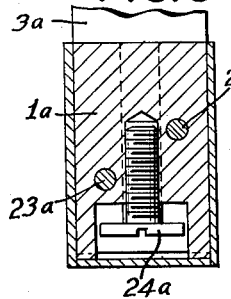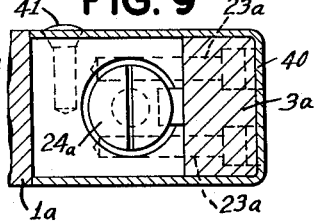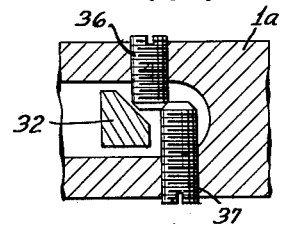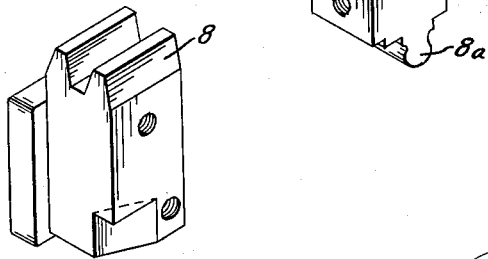

United States Patent Office 2,723,459
Patented Nov. 15, 1955

2,723,459

INDICATOR TYPE TOOTH THICKNESS SNAP GAGE

Clarence B. Stapleton, Royal Oak, Mich., assignor to Vinco Corporation, a corporation of Michigan Application June 26, 1952, Serial No. 295,615

4 Claims. (Cl. 33—147)

This invention relates to improvements in indicator type snap gages for measuring the diameter of toothed machine elements, and, more particularly, to such gages as used for measuring the thickness of the teeth of gears and splines.

In the manufacture of high precision gears, it has long been the custom to indicate the tooth thickness on the working drawing of the gear as the "measurement over pins." These pins are accurately ground to a known dimension and are placed respectively in the tooth spaces on opposite sides of the gear. They contact the teeth at, or very close to, the pitch line of the gear. When the gear has been properly cut, that is, when the gear teeth have been machined to the proper thickness, the "pin dimension" called for will be satisfied.

During the cutting of the gear teeth the tooth thickness is checked from time to time and each of these checking operations has heretofore been tedious and time-consuming, inasmuch as the making of a "measurement over pins" is a difficult task. If the gear and the arbor are left in the machine, the pins must be held in position by one hand, and a micrometer caliper manipulated with the other hand to measure the distance between the outside surfaces of the two pins. If the gear and arbor are removed from the machine and a "bench" method is employed in making the measurements, for example, by the use of a surface plate and indicator, the operation is equally tedious and time-consuming.

In the manufacture of splines, the checking of "pin dimensions" is fully as difficult as in the manufacture of gears, and sometimes more difficult, because of the general construction of the part upon which the spline is being cut.

The primary object of the present invention is to simplify the checking of "pin dimensions" during the process of manufacture of gears and splines.

It is also an object of the invention to provide a construction of indicator type snap gage by means of which the equivalent of "measurement over pins" can be taken while the gear is in place in the machine, the reading on the indicator informing the operator exactly how much stock must be removed in order to satisfy the "pin dimensions" given on the drawing.

It will be understood that the final inspection of the gears after the machining operation has been completed will be carried out, as heretofore, on a rolling fixture, for example, like that shown in Osplack Patent No. 2,540,961. The final inspection of splines, however, is a different matter. Their construction is usually such that they can not be applied to a rolling fixture, and inspection by means of two or more gages is usually required. Also, in most cases, splines must qualify as an "inter-changeable part" so that extreme precautions are necessary to see that the allowable tolerances have been adhered to. It is customary practice to use the several gages for the purpose of checking the "pin dimensions," making the inspection time-consuming and expensive.

Accordingly, another object of the present invention is to provide a snap gage which is so constructed that the final inspection of splines can be accomplished with one checking operation, since the dial reading indicates directly whether the tooth thickness is, or is not, within the required limits of tolerance.

A further object of the present invention is to provide an indicator type snap gage which is so arranged as to reduce to a minimum the wear on the mechanism of the indicator.

Another object of the invention is to provide an indicator type snap gage having an unusually high degree of accuracy.

A further object of the invention is to provide an indicator type of snap gage which is of extreme simplicity in its construction.

The invention will be understood from a consideration of the accompanying drawings which illustrate, by way of example, the construction of two forms of the improved gage. In these drawings:

Fig. 1 is a perspective view showing the application of the gage to a spline or gear;

Fig. 2 is a view of the gage in side elevation with the upper part broken away and shown in vertical section;

Fig. 2a is a detailed enlarged vertical section of parts shown in Fig. 2;

Fig. 3 is a view in end elevation looking from the right of Fig. 2 with the parts in position to be applied to a gear;

Fig. 4 is a fragmentary view in end elevation looking from the left of Fig. 2 and drawn to an enlarged scale with parts broken away;

Fig. 5 is a bottom view of a detail of Fig. 2;

Fig. 6 is a view similar to Fig. 2 showing a modified form of gage;

Fig. 7 is a view of the gage of Fig. 6 looking from above at right angles to the face of the dial indicator;

Fig. 8 is a detail section taken on line 8—8 of Fig. 6;

Fig. 9 is a similar view taken on line 9—9 of Fig. 6;

Fig. 10 is a detail section taken on line 10—10 of Fig. 6; and

Figs. 11 and 12 are perspective views of two modified forms of stationary gages.

The device according to the present invention includes a frame 1 and handle 2 (Figs. 1 and 2) on which are mounted a fixed gaging block 3 and a retractile gaging block 4, which, respectively, engage teeth on opposite sides of the gear G whose tooth thickness is to be gaged. These two gaging blocks are similar in shape and each have convex side faces (Fig. 2a) so as to make line contact, or substantially line contact, with the tooth faces. The gaging blocks are so dimensioned with respect to the dimensions of the teeth of the gear G that when the gear has been properly cut to the correct tooth thickness, the two gaging blocks will simultaneously engage the sides of the two pairs of teeth to which they are adjacent on a predetermined reference circle C. Such reference circle may be the pitch circle of the gear, or it may be slightly larger or slightly smaller than the pitch circle, but it will be understood that the gaging blocks instead of having convex side faces may, if desired, have flat faces, the shape of the two gaging blocks being otherwise substantially as shown in Figs. 2, 2a and 6. The frame of the gaging device is also provided with a movable mounting (to be described) for one of the gaging blocks whereby such block can be moved first outwardly and then inwardly, in applying the device to the gear G. A dial indicator mechanism is mounted on the frame and operatively connected to the movable mounting whereby when the gage blocks are in contact with the pairs of teeth on opposite sides of a gear, the pointer of the mechanism is caused to indicate on the dial any deviation from the correct tooth thickness.

When the spline or gear whose tooth thickness is to be measured has an even number of teeth the two blocks 3 and 4 are made single and coact with the pairs of teeth which are opposite one another as shown in Fig. 2. When such gear has an odd number of teeth the lower single gaging block 3 is replaced by a gaging block such as indicated at 8 in Fig. 11 having two projections instead of one. In order to facilitate the quick application of the gage to a spline or gear a locating block 5 is mounted in adjustable position on frame 1 substantially midway between the two gaging blocks 3 and 4. Also, if desired, gaging blocks may be used having substantially the form of a pin, such as shown at 8a in Fig. 12. Gaging blocks of the roller type may also be used.

In order to permit application of the gage to the articles to be measured, the upper or retractile block 4 is retractably mounted on a lever 6 which is pivoted at 7 to frame 1 and provided with a rear arm or extension 6a which terminates in a thumb piece 9. Block 4 is mounted on lever 6 in such a way as to be removable as shown by the holding screw in Fig. 2 and Fig. 6. A removable plate 1' on the frame gives access to lever 6 to facilitate changing block 4 for different size gears, or otherwise. A compression spring 10 which is mounted in an aperture in the upper portion of frame 1 urges the forward end of lever 6 and its block 4 towards engagement with the gear G. Spring 10 is held in place by a pair of screws 11, one an adjusting screw and the other a locking screw.

When the thumb piece 9 is depressed the forward end of lever 6 is raised into a hooded portion 12 of frame 1 which serves to protect the retractile block 4 when bringing the device to gaging position. The rear extension 6a is arranged to contact a stop screw 13 which limits the movement of the lever under the influence of spring 10 when the device is not in position on a gear. Screw 13 has a conical point engaging one corner of lever extension 6a and is held in adjusted position by means of a lock screw 14 (Fig. 4).

The dial indicator which is indicated generally by numeral 15, comprises a housing at the rear of which there is a post 16 by which the indicator is mounted and held in fixed position on frame 1 by the screw shown in Fig. 2. The indicator is mounted in a cup shaped recess 17 in the upper part of frame 1 so that it is protected. The indicator is provided with a dial 18 divided by suitably spaced reference marks over which an indicating hand 19 sweeps, the dial having a transparent cover 20.

The dial indicator is operated by means of a plunger 21 which is operatively connected with pointer 19 through a train of gears having a high multiplying factor, usually of about 150. Operating plunger 21 is spring biased in the downward or outward direction and is arranged to engage the upper surface of the rear extension 6a of lever 6.

The construction of the mechanism of indicator 15 is such that plunger 21 reaches the outward limit of its range of movement almost immediately after lever extension 6a is moved away from stop screw 13. In other words, when thumb piece 9 is depressed to retract block 4 the rear extension 6a of lever 6 separates from or leaves the end of plunger 21, as is indicated by the dot and dash line in Fig. 2. Consequently, no movement of the operating mechanism of indicator 15 takes place when the block 4 is retracted in order to place the device in gaging position upon the spline or gear.

It is not until pressure on the thumb piece 9 is released allowing spring 10 to cause gaging block 4 to move into contacting position between the teeth of the gear that operating member 21 is engaged by lever 6. As block 4 moves into such position its supporting lever 6 successively reengages the operating plunger 21 and stop screw 13, this screw being adjusted to permit full scale movement of the indicating hand 19 but to prevent overtravel thereof which might injure the delicate operating mechanism of the dial indicator. Lever 6 has a wide range of movement so as to retract block 4 a sufficient distance to more than clear the teeth of the gear when removing or applying the gaging device. This movement can take place without any further actuation of the indicator mechanism 15.

The lower block 3 which has been referred to as a fixed block, is nevertheless mounted so as to be adjustable, and by so doing, the position of retractile block 4 and lever 6 is shifted and in this way the indicator pointer 19 can be set at zero or at any other desired position to suit the conditions of operation. Block 3 is held in position by means of a clamping plate 22 and two clamping screws 23. The holes in block 3 through which these screws pass are made enough larger than the screws so as to permit the desired range of adjustment, and in fact these holes may be in the form of vertical slots if required. The adjusting movement of block 3 is obtained by means of a calibrating screw 24 which is threaded into frame 1, this screw having an enlarged flat head which engages within the recess 25 in one corner of block 3 (see Fig. 5).

Ordinarily, the procedure in using the gage is to set the zero of the indicator dial 18 midway between the diameters of the "go" and "no go" master gages for the gear or spline which is being manufactured. Then, by placing the gage first on the "go" master gage then on the "no go" master gage, the exact limits of permissible tolerance, plus and minus, are determined on the dial. These limits are customarily marked by placing on the transparent cover 20 strips of pressure sensitive adhesive tape such as indicated respectively at 26 and 27 in Fig. 7. In this way these limits are established with little likelihood of a setting being disturbed. After the dial and the lower block 4 have been set with the master gages, the locating block 5 is so adjusted that when the gear is brought nearly into contact with it, as shown in Fig. 2, the blocks 3 and 4 will coact with the proper tooth spaces.

With such procedure the operator, in manufacturing, can judge the amount of stock he needs to remove in order to bring the size of the gear or spline within the tolerance permitted. Also, when the snap gage is used for inspection of finished splines one reading tells the inspector whether the thickness of the teeth of the particular spline is within the permissible tolerance.

In the modified construction, shown in Figs. 6 and 7, the dial indicator 15 is mounted more nearly horizontal and the retractile block 4a is actuated by means of a push button action instead of a swinging action. This is accomplished by means of a three-armed lever 28 which is pivoted on the frame at 29 and which has a triangular shaped downwardly projecting arm 30 with which the rounded inner end of a plunger 31 coacts, and a third upwardly directed arm 32 to engage the operating plunger 21 of indicator 15. Plunger 31 slides into a recess in frame 1a, the outer portion of which is counterbored to receive a thumb actuated button member 33.

Between the bottom of this counterbore and the inner end of member 33 is a compression spring 34 which biases the inner plunger 31 away from arm 30 of lever 28. This lever is urged into engagement with the work by means of compression spring 35. The stop screw for limiting the movement of lever 28 when the gage is not applied to a workpiece is indicated at 36 (Fig. 10). This stop screw is locked by means of a screw 37 accessible from the opposite side of frame 1a.

The upper or retractile block 4 is removably mounted on the end of lever 28 in the same way that block 4 is mounted on lever 6, but in place of the hooded portion 12 of Fig. 2 which is an integral part of frame 1, there is a removable cap or protector 38. This is U-shaped in top view and held in place by means of a single screw 39 which clamps the opposite sides at the upper margin onto the portion of frame 1a which is immediately below dial indicator 15. With this construction it is more convenient to change block 4a.

The lower or fixed, but adjustable, block 3a is mounted on frame 1a in a slightly different manner from the construction used for block 3, the main difference being that the adjusting screw 24a is mounted centrally, as shown in Figs. 8 and 9, instead of at one side, as shown in Fig. 5. The head of this screw, consequently, engages a groove 25a milled centrally in the lower portion of block 3a, as shown in Fig. 6. The clamping screws 23a are arranged in substantially the same position as clamping screws 23 of Fig. 2. However, a removable cover member or cap 40 is arranged to surround the lower portion of frame 1a in the vicinity of the mounting of block 3a on two sides, the bottom and the end. This cap is held in place by means of a screw 41. While it is necessary to remove cap 40 in order to change block 3a, this cap serves to protect the setting of the block from being accidentally altered.

Two forms of the improved tooth thickness gage have been described but the scope of the invention is set forth in the appended claims.

I claim:

1. In a device for gaging gears or the like, a frame, a fixed gaging block mounted on said frame to engage one side of the gear to be gaged, a retractile gaging block to engage the opposite side of said gear, a three armed lever pivoted on said frame, said retractile block being mounted on one arm of said lever, a dial indicator mechanism mounted on said frame, said mechanism having an operating member actuated by a second arm of said lever, a spring operatively connected with said lever to urge said retractile block into engagement with the gear, means associated with the third arm of said lever for manually operating said lever to move said block to retracted position to allow said blocks to embrace the gear, and adjustable stop means for said lever to prevent overtravel actuation of said dial indicator mechanism by said lever, said stop means comprising a sloping surface on said lever, a stop screw adjustable in a threaded aperture in said frame the inner end of which screw engages different positions along said sloping surface at different positions of said screw in said aperture, and a lock screw frictionally engaging said stop screw to hold it in adjusted position.

2. In a device for gaging gears or the like, a frame, a fixed gaging block mounted on said frame to engage one side of the gear to be measured, a movable gaging block to engage the opposite side of said gear, a lever pivoted on said frame, said movable block being mounted on said lever, a spring operatively connected with said lever to urge said movable gaging block towards said fixed gaging block, means for manually operating said lever to retract said movable block from said fixed block and to allow said blocks to close upon said gear under the action of said spring, a dial indicator mechanism mounted on said frame and provided with a spring biased operating member, said operating member being actuated by said lever, the operating spring of said lever being stronger than the biasing spring of said indicator mechanism, and adjustable stop means for said lever to prevent overtravel actuation of said dial indicator mechanism by said lever, said stop means comprising a sloping surface on said lever, a stop screw adjustable in a threaded aperture in said frame the inner end of which screw engages different positions along said sloping surface at different positions of said screw in said aperture, and a lock screw frictionally engaging said stop screw to hold it in adjusted position.

3. A device for gaging gears and the like as claimed in claim 1 in which the stop screw of the adjustable stop means is disposed in an aperture in one side of said frame, and the lock screw is disposed in a threaded aperture in the opposite side of said frame, the axes of said screws being parallel but slightly out of alignment with one another so that the inner end of the lock screw engages the edge portion of the end of the stop screw.

4. A device for gaging gears and the like as claimed in claim 2 in which the stop screw of the adjustable stop means is disposed in an aperture in one side of said frame, and the lock screw is disposed in a threaded aperture in the opposite side of said frame, the axes of said screws being parallel but slightly out of alignment with one another so that the inner end of the lock screw engages the edge portion of the end of the stop screw.

References Cited in the file of this patent

UNITED STATES PATENTS

| 744,796 | Reilly | Nov. 24, 1903 |
| 1,027,418 | Heide | May 28, 1912 |
| 2,561,534 | Parker | July 24, 1951 |

FOREIGN PATENTS

| 544,465 | Great Britain | Apr. 14, 1942 |
| 595,727 | Great Britain | Dec. 15, 1947 |
| 602,701 | Great Britain | June 1, 1948 |